(12) United States Patent
Zheng et al.

(10) Patent No.: US 12,009,955 B2
(45) Date of Patent: Jun. 11, 2024

(54) RECEIVER BASED ON MULTIPLE FREQUENCY-SHIFT KEYING MODULATION AND RECEIVING METHOD THEREOF

(71) Applicant: Xiamen Zifisense InfoTech Co., Ltd., Fujian (CN)

(72) Inventors: Delai Zheng, Fujian (CN); Zhuoqun Li, Fujian (CN)

(73) Assignee: Xiamen Zifisense InfoTech Co., Ltd., Fujian (CN)

(*) Notice: Subject to any disclaimer, the term of this patent is extended or adjusted under 35 U.S.C. 154(b) by 0 days.

(21) Appl. No.: 18/377,282

(22) Filed: Oct. 5, 2023

(65) Prior Publication Data
US 2024/0039771 A1    Feb. 1, 2024

Related U.S. Application Data

(63) Continuation of application No. PCT/CN2022/079933, filed on Mar. 9, 2022.

(51) Int. Cl.
H04L 27/14 (2006.01)
H04L 27/10 (2006.01)
H04L 27/12 (2006.01)

(52) U.S. Cl.
CPC ............ H04L 27/106 (2013.01); H04L 27/12 (2013.01); H04L 27/14 (2013.01)

(58) Field of Classification Search
CPC ......... H04L 27/06; H04L 27/10; H04L 27/12; H04L 27/14; H04L 27/106
See application file for complete search history.

(56) References Cited

U.S. PATENT DOCUMENTS

| 8,199,706 B2* | 6/2012 | Bertrand ............ H04L 27/2613 370/329 |
| 2004/0081205 A1 | 4/2004 | Coulson |

(Continued)

FOREIGN PATENT DOCUMENTS

| CN | 1964337 A | 5/2007 |
| CN | 102143117 A | 8/2011 |

(Continued)

OTHER PUBLICATIONS

Corresponding International Patent Application No. PCT/CN2022/079933, International Search Report, dated Jun. 9, 2022.

(Continued)

*Primary Examiner* — Siu M Lee
(74) *Attorney, Agent, or Firm* — Cooper Legal Group LLC

(57) ABSTRACT

A receiving method based on multiple frequency-shift keying (M-FSK) modulation. The method comprises performing M-FSK demodulation on a frame structure comprising a preamble frame, a SYNC frame, and a data frame. The performing comprises: performing the M-FSK demodulation of the preamble frame using an autocorrelation time-frequency synchronization technology; performing the M-FSK demodulation of the preamble frame using a time-frequency synchronization technology using cross-correlation sliding fast Fourier transform (FFT); and performing the M-FSK demodulation of at least one of the SYNC frame or the data frame using an M-FSK data demodulation technology using adaptive and scalable FFT.

13 Claims, 8 Drawing Sheets

(56) References Cited

U.S. PATENT DOCUMENTS

| | | | |
|---|---|---|---|
| 2012/0207231 A1 | | 8/2012 | Zhang et al. |
| 2014/0269560 A1* | | 9/2014 | Jain .................. H04L 5/0044 |
| | | | 370/329 |
| 2015/0237178 A1 | | 8/2015 | Zhang et al. |
| 2020/0314891 A1* | | 10/2020 | Li .................. H04W 16/14 |

FOREIGN PATENT DOCUMENTS

| | | | |
|---|---|---|---|
| CN | 104717168 A | | 6/2015 |
| CN | 106464643 A | | 2/2017 |
| CN | 106998243 A | | 8/2017 |
| CN | 107360624 A | | 11/2017 |
| CN | 112311711 A | | 2/2021 |
| CN | 112583750 A | | 3/2021 |
| CN | 113114601 A | | 7/2021 |

OTHER PUBLICATIONS

Corresponding International Patent Application No. PCT/CN2022/079933, Written Opinion, dated Jun. 9, 2022.

Corresponding Chinese Patent Application No. CN202113066616.0, First Office Action, dated Jan. 12, 2022.

Corresponding Chinese Patent Application No. CN202113066616.0, Notification to Grant, dated Feb. 18, 2022.

Wang, Zhen et al., "MIMO-MFSK Spatial Multiplexing in Rician Channel with Large Doppler Shift", 2019 IEEE 19th International Conference on Communication Technology, Dec. 31, 2019.

Zhuokai, Yang, "Novel SNR Estimation Algorithm Based on Repetitive Sequence DFT for SC-FDE System", The 20th Research Institute of China Electronics Technology Group Corporation, 2020, pp. 358-361, with English abstract.

Bluemm, Christian, et al., "Robust time and frequency synchronization for OFDM systems with maximum spectrum flexibility", 2012 IEEE—APS Topical Conference on Antennas and Propagation in Wireless Communications (APWC), Sep. 2012, pp. 856-860.

Chung, Char-Dir, et al., "Preamble sequence design for spectral compactness and initial synchronization in OFDM", IEEE Transactions on Vehicular Technology, vol. 67, Issue 2, Oct. 2, 2017, pp. 1428-1443.

* cited by examiner demodulating the preamble frame: performing the M-FSK demodulation of the preamble frame using an autocorrelation time-frequency synchronization technology when the preamble frame is a repeating sequence and each symbol uses the M-FSK modulation; and performing the M-FSK demodulation of the preamble frame using a time-frequency synchronization technology using cross-correlation sliding FFT when the preamble frame is a non-repeating sequence

demodulating the SYNC frame and/or the data frame: performing the M-FSK demodulation of the SYNC frame and the data frame using an M-FSK data demodulation technology using adaptive and scalable FFT

Fig. 2

RECEIVER BASED ON MULTIPLE FREQUENCY-SHIFT KEYING MODULATION AND RECEIVING METHOD THEREOF

RELATED APPLICATIONS

This application is a continuation of International patent application PCT/CN2022/079933, filed on Mar. 9, 2022, which claims priority to Chinese patent application 202110366616.0, filed on Apr. 6, 2021. International patent application PCT/CN2022/079933 and Chinese patent application 202110366616.0 are incorporated herein by reference.

FIELD OF THE DISCLOSURE

The present disclosure relates to the field of communication technologies, and in particular relates to a receiver based on multiple frequency-shift keying (M-FSK) modulation and a receiving method thereof.

BACKGROUND OF THE DISCLOSURE

Demodulation is a process for restoring information from a modulated signal that carries information. In various systems for transmitting or processing information, transmitting ends modulate carrier waves using information to be transmitted to produce the modulated signal that carries the information. Receiving ends need to restore transmitted information before use, and this process is demodulation.

Most conventional M-FSK demodulation technologies are based on analog methods or correlation test methods being matched in a time domain. These methods have poor expandability and have poorer reception performance.

BRIEF SUMMARY OF THE DISCLOSURE

The present disclosure provides a receiving method based on M-FSK modulation. M-FSK demodulation is performed on a frame structure comprising a preamble frame, a SYNC frame, and a data frame. M-FSK is M-order frequency shift keying modulation; bits are modulated to select a frequency point from continuous M orthogonal modulation frequency points in a frequency domain to be transmitted based on a requirement of each symbol and wherein M is a power of 2, and each M-FSK symbol can transmit log 2(M) bits. Two other important parameters are a minimum modulation frequency point interval (sub-carrier space (SCS)) and a time length T of each symbol. A view of the M-FSK modulation is shown in FIG. 8. The receiving method specifically comprises:

Demodulating the preamble frame comprising performing the M-FSK demodulation of the preamble frame using an autocorrelation time-frequency synchronization technology when the preamble frame is a repeating sequence and each symbol uses the M-FSK modulation; and performing the M-FSK demodulation of the preamble frame using a time-frequency synchronization technology using cross-correlation sliding fast Fourier transform (FFT) when the preamble frame is a non-repeating sequence; and Demodulating at least one of the SYNC frame or the data frame comprising performing the M-FSK demodulation of at least one of the SYNC frame or the data frame using an M-FSK data demodulation technology using adaptive and scalable FFT.

The receiving method based on the M-FSK modulation according to the foregoing description, the receiving method comprises: obtaining a new sequence by autocorrelation of sequences of the preamble frame when the preamble frame is the repeating sequence and each symbol uses the M-FSK modulation, defining a preamble synchronization point corresponding to an autocorrelation peak value point as a synchronization point by satisfying a threshold value, and receiving a complete preamble sequence when an autocorrelation value is maximum.

The receiving method based on the M-FSK modulation according to the foregoing description, the receiving method further comprises: obtaining a carrier frequency offset (CFO) by calculating based on an autocorrelation value of a maximum of a correlation value magnitude, a number of time-delay symbols (zz), and a time length (T) of M-FSK symbols using CFO=phase(Corr(Kmax))/($2\pi^*(T^*zz)$), wherein the phase function is a sought phase, the phase is calculated based on imaginary and real parts of a complex number, and Corr(k) is a new sequence obtained by the autocorrelation of the sequences of the preamble frame. Corr(Kmax) is an autocorrelation value of a maximum of a correlation value magnitude, and Kmax is the position of maximum of autocorrelation value.

The receiving method based on the M-FSK modulation according to the foregoing description, wherein the non-repeating sequence comprises a non-repeating sequence based on modulation of an M-FSK sequence, a constant Amplitude Zero Auto Correlation (CAZAC) sequence, or a ZadoffChu sequence.

The receiving method based on the M-FSK modulation according to the foregoing description, wherein the time-frequency synchronization technology using cross-correlation sliding FFT comprises: using a scalable local sequence in receiving signals with a same sampling rate to function as a conjugate dot product to achieve deserialization information based on a sliding FFT method for receiving of an M-FSK modulation sequence and a local sequence, converting into a frequency domain to seek a maximum value and location information in the frequency domain to obtain a correlation peak value at this time and a value for frequency offset estimation, comparing peak values at different times, defining a maximum value of the peak values greater than a certain threshold value as a time synchronization point of the preamble, and seeking a frequency offset value based on frequency magnitude represented by intervals of direct current (DC) frequency points and a position of a frequency point at a synchronization time.

The receiving method based on the M-FSK modulation according to the foregoing description, wherein the M-FSK data demodulation technology using adaptive and scalable FFT comprises: demodulating scalable advanced M-FSK transmit symbols based on frequency point intervals (sub-carrier spacing (SCS)), symbol time length, and a number of modulation frequency points, wherein adaptive demodulation is demodulation based on data from the M-FSK modulation.

The receiving method based on the M-FSK modulation according to the foregoing description, wherein demodulation and synthesis of data symbols is based on synthesis of each of the M-FSK symbols based on a multi-antenna synthesis technology in which a peak value in a frequency domain functions as correlation synthesis coefficients, and a synthesis weight value of each of antennas is a value corresponding to a largest of all frequency points of energy after the M-FSK symbols are converted into the frequency domain or only retains a largest value of modulation frequency points.

The receiving method based on the M-FSK modulation according to the foregoing description, wherein a synthesis weight value of each of antennas passes through a value corresponding to a largest energy in a frequency domain of the M-FSK symbols based on synchronous multi-antenna synthesis technology using the non-repeating sequence.

The present disclosure further provides a receiving method based on multiple frequency-shift keying (M-FSK) modulation, the receiving method comprises: performing M-FSK demodulation on a frame structure comprising a preamble frame, a SYNC frame, and a data frame, wherein the performing comprises: demodulating the preamble frame comprising performing signal-to-noise ratio (SNR) test and time-frequency synchronization of the preamble frame by using an autocorrelation time-frequency synchronization technology when the preamble frame is a repeating sequence and each symbol uses the M-FSK modulation; and performing the SNR test and the time-frequency synchronization of the preamble frame using a time-frequency synchronization technology using a cross-correlation sliding fast Fourier transform (FFT) when the preamble frame and is a non-repeating sequence; and demodulating at least one of the SYNC frame or the data frame comprising obtaining a maximum likelihood test performance using an M-FSK data demodulation technology using adaptive and scalable FFT.

The receiving method based on the M-FSK modulation according the foregoing description, wherein demodulation and synthesis of data symbols is based on synthesis of each of the M-FSK symbols based on a multi-antenna synthesis technology in which a peak value in a frequency domain is correlation synthesis coefficients, and a synthesis weight value of each of antennas is a value corresponding to a largest of all frequency points of energy after the M-FSK symbols are converted into the frequency domain or only retains a largest value of modulation frequency points.

The receiving method based on the M-FSK modulation according to the foregoing description, wherein a synthesis weight value of each of antennas passes through a value corresponding to a largest energy in a frequency domain of the M-FSK symbols based on synchronous multi-antenna synthesis technology using the non-repeating sequence.

The receiving method based on the M-FSK modulation according to the foregoing description, wherein the SNR test and the time-frequency synchronization comprises: synchronizing time points based on a non-repeating preamble sequence, defining energy at a peak value in a frequency domain of deserialization information or near the peak value as signal energy, defining time points other than the signal energy as noise energy, and seeking SNR based on the signal energy and the noise energy; and converting into the frequency domain based on the M-FSK symbols, defining a total energy of points at the peak value of the frequency domain or near the peak value as the signal energy, defining frequency points other than the signal energy as the noise energy, and obtaining the SNR based on the signal energy and the noise energy.

The present disclosure further provides a receiver based on M-FSK modulation, wherein the receiver uses the receiving method based on the M-FSK modulation according to claim 1.

The present disclosure has the following advantages.

1. The present disclosure uses a receiver related technology to achieve low sensitivity based on advanced M-FSK and to adapt to various multipath and Doppler scenes at the same time;

2. The present disclosure uses synchronization technology to greatly increase sensitivity of a test technology and synchronize frequency even when frequency offset is larger, so that Temperature Compensate X'tal (crystal) Oscillator (TCXO) on a transmitting end is saved;

3. The present disclosure uses a demodulation technology based on adaptive FFT to obtain maximum likelihood demodulation performance;

4. The present disclosure uses a multi-antenna synthesis technology to enable a receiving end to obtain energy and diversity gain; and 5. An M-FSK energy test and a SNR test method of the present disclosure enable the receiving end to relatively accurately obtain a corresponding reception status.

BRIEF DESCRIPTION OF THE DRAWING

In order to more clearly describe embodiments of the present disclosure or the technical solutions in the existing techniques, the drawings used in the embodiments or the existing techniques are simply described below. It is obvious that the drawings described below are merely some embodiments described in the present disclosure, and other drawings can be obtained based on the drawings by a person of skill in the art.

FIG. 2 illustrates a view of a receiving method based on M-FSK modulation of Embodiment 1 of the present disclosure.

DETAILED DESCRIPTION OF THE EMBODIMENTS

Figure 1:
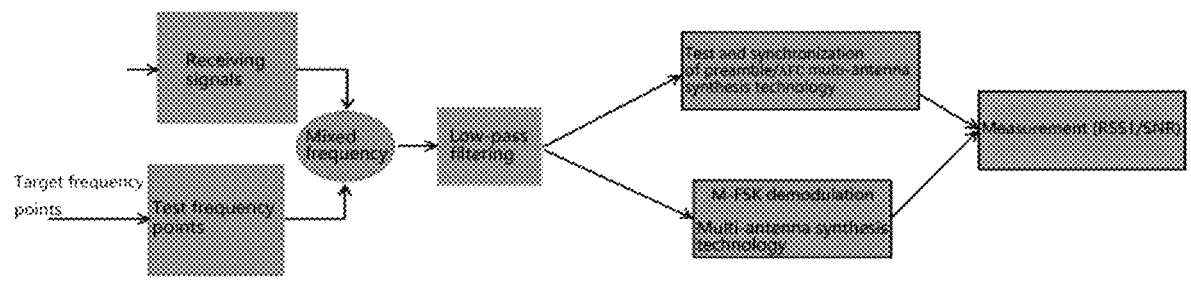
FIG. 1 illustrates a view of an algorithm of an M-FSK digital demodulation advanced receiver based on zero intermediate frequency (IF).

The technical solution of the embodiments of the present disclosure will be clearly and completely described below in combination with the drawings of the embodiments of the present disclosure. It is obvious that the described embodiments are merely some embodiments of the present disclosure instead of all embodiments. It is intended that the scope of the present disclosure covers all other embodiments provided that they are obtained without creative works by person of skill in the art.

A receiver based on M-FSK modulation and a receiving method thereof of the present disclosure are a receiver and a receiving method designed based on advanced M-FSK transmission technology disclosed in Chinese patent applications 202011132046.0 and 202011402522.6, which are incorporated herein by reference. A transmitter of the aforementioned applications and a receiver of the present disclosure combine a low-power wide-area network (LPWAN) technology based on the advanced M-FSK transmission technology. The present disclosure describes in detail an adaptive and scalable receiver technology based on the advanced M-FSK transmission technology with a test capability at low signal-to-noise ratio, anti-frequency offset capability, measurement technologies, energy obtained by multi-antenna synthesis, diversity gains, and scalable demodulation technologies.

Before the receiver and the receiving method based on the advanced M-FSK modulation technology of the present disclosure is introduced, a frame structure of a transmitting end of the present disclosure based on the advanced M-FSK modulation technology (the present disclosure refers to an adaptive or configurable M-FSK modulation transmission technology and a corresponding receiver technology as the advanced M-FSK modulation technology) is as follows.

| Preamble (M-FSK) | SYNC (M-FSK) | Data (M-FSK) |
| --- | --- | --- |

A preamble frame is used for frame test and frame synchronization; a SYNC frame is used for constructing data format; and a data frame is modulated to M-FSK to be transmitted using coded or uncoded modulations, that is, various modulation and coding schemes are supported. The preamble frame and the SYNC frame can use the conventional 2FSK or 2GFSK formats (i.e., using 2FSK or 2GFSK modulations) and can also use higher-order modulation technologies, i.e., in the advanced M-FSK modulation technology of the present disclosure, modulation order M=2n (n is an integer and n≥1). Further, in order to reduce frequency spectral leakage, the advanced M-FSK modulation technology preserves phase continuity between symbols, i.e., M-CPFSK; in order to further reduce frequency spectral leakage, Gaussian filtering is added, i.e., M-GFSK. In the present disclosure, the advanced M-FSK modulation technology includes the two modulation schemes.

The advanced M-FSK modulation technology can use the conventional 2FSK or 2GFSK formats. The preamble frame is transmitted using the conventional 2FSK or 2GFSK formats, SYNC code is modulated using the conventional 2FSK or 2GFSK formats, and the SYNC frame contains various modulation information. When the various modulation information is the same as the conventional 2FSK or 2GFSK formats, the data frame adopts the conventional 2FSK or 2GFSK formats. When the various modulation information is different from the conventional 2FSK or 2GFSK formats, a frame structure of the data frame is modulated and transmitted according to predefined rules.

The modulation order M of the advanced M-FSK modulation technology is 2 or more, and the preamble frame, the SYNC frame, and the data frame are modulated using M-FSK formats.

A format or transmitted sequence information of the preamble frame differs from the conventional 2FSK or 2GFSK formats. Specifically, various formats are as follows:

1. A preamble code can be a repeating sequence. A minimum repeating granularity is N symbols, N≥2, and a number of all symbols of the preamble code is integer multiples of N;
2. The preamble code is a non-repeating m-sequence modulated using the conventional 2FSK or 2GFSK formats. The non-repeating m-sequence is an acronym of a longest linear shift register sequence. As the acronym implies, the non-repeating m-sequence is a longest code sequence generated by a multistage shift register or a delay element thereof by linear feedback. In a binary shift register, if n is a stage number of the binary shift register, an n-stage shift register then has a total of 2n states, and there are still 2n−1 states except for all zero states. Therefore, a generable longest code sequence is 2n−1 digits;
3. The preamble code can differ from the conventional formats, i.e., the M-FSK modulation is not needed. The preamble code supports to use a Constant Amplitude Zero Auto Correlation (CAZAC) sequence, e.g., a ZadoffChu sequence is used, and the ZadoffChu sequence has constant envelope characteristics and good correlation.

Embodiment 1

Embodiment 1 of the present disclosure provides a receiving method based on M-FSK modulation. An algorithm of an M-FSK digital demodulation advanced receiver based on zero IF shown in FIG. 1 is used and is achieved based on the aforementioned M-FSK modulation transmission technology. As shown in FIG. 2, the receiving method based on the M-FSK modulation includes:

(1) Demodulating the Preamble Frame

An arrangement of two frame structures of a transmitter and a receiver are predefined and comprises a modulation order M, a sequence format of the preamble frame, etc. In an M-FSK modulation method of the transmitter, the preamble frame can be designed as a repeating sequence or a non-repeating sequence. Therefore, when the receiver is demodulated, a corresponding demodulation process of the preamble frame using the repeating sequence or the non-repeating sequence needs to be performed:

a) When the preamble frame is the repeating sequence, and each of symbols uses M-FSK modulation, M-FSK demodulation of the preamble frame is performed using an autocorrelation time-frequency synchronization technology.

A time delay of an autocorrelation sequence is a multiple number of a symbol number of a minimum repeating sequence, and an autocorrelation length is a sequence length minus a time delay of two autocorrelation sequences. A synchronization point is a corresponding preamble synchronization point of an autocorrelation peak value point, and a carrier frequency offset (CFO) is obtained based on a phase position of the autocorrelation peak value position and the time delay of the two autocorrelation sequences.

Figure 3:
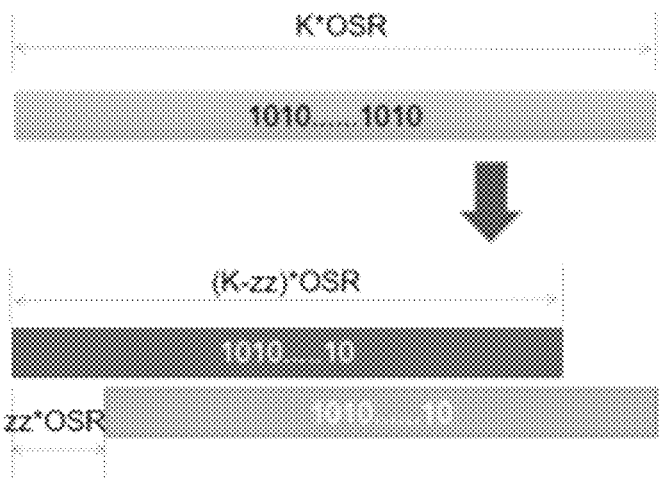
FIG. 3 illustrates a view of a reception of a receiver according to a preamble frame using a repeating sequence.
Figure 4:
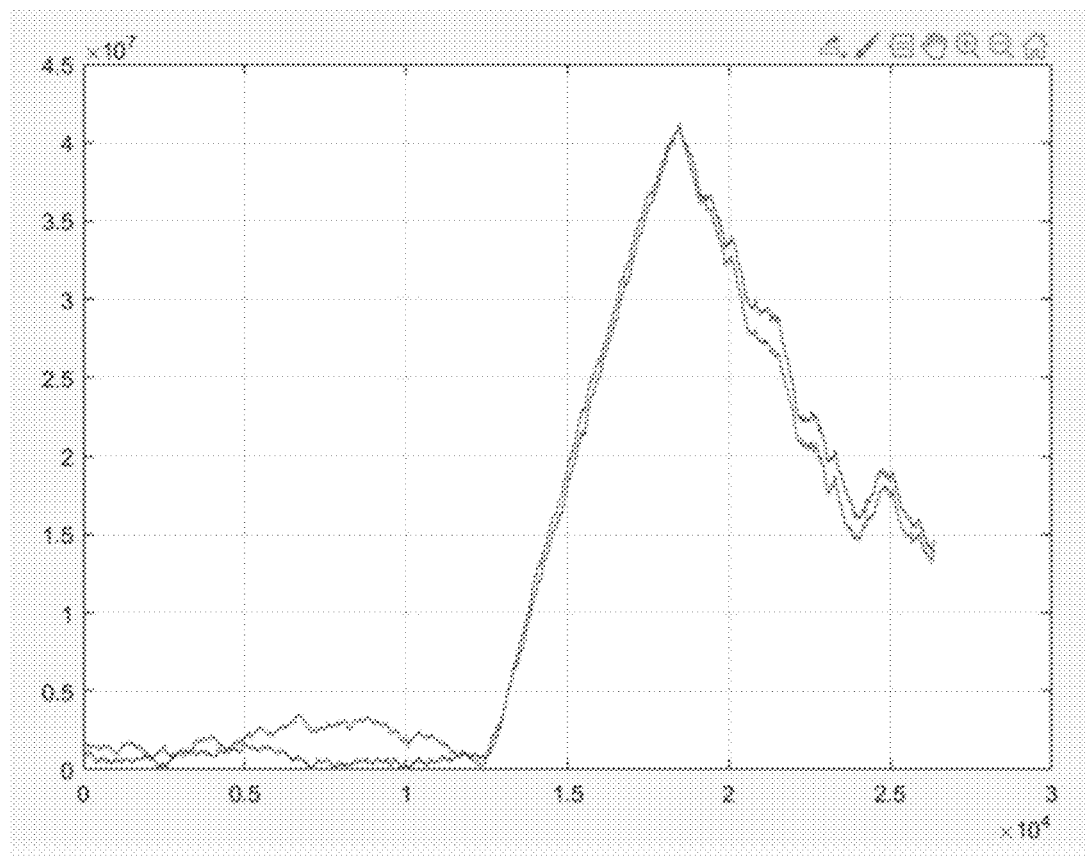
FIG. 4 illustrates a view of a correlative relationship between a sequence of the preamble frame and an autocorrelation value.

Taking a 2FSK modulation repeating sequence as an example, a reception of the receiver according to the preamble frame is shown in FIG. 3. If bits [1010 . . . 10] of the 2FSK modulation repeating sequence are K bits in total, i.e., a symbol number of the preamble frame is K, and OSR (oversampling) is a sampling number of each of the symbols, the sequence length of the preamble frame of the transmitter is then K*OSR. Since there is a time delay of the symbols in a transmission process of the frame structure, a length of the autocorrelation sequence of the preamble frame received by the receiver is (K−zz)*OSR, where zz is a symbol number of a time delay of an autocorrelation time and is a multiple number of the symbol number of the minimum repeating sequence, a value range is 2 to K/2, and a new sequence Corr(k) is obtained by autocorrelation. The sequence of the preamble frame turns from nothing to something and from the something to the nothing, and an autocorrelation value therefore gradually increases and then gradually decreases. When the autocorrelation value is maximum and greater than a certain threshold value, a complete preamble complete sequence is then received, and this time is a preamble synchronization point (FIG. 4 illustrates a view of a correlation relationship between the sequence of the preamble frame and the autocorrelation value).

The carrier frequency offset calculated based on a phase position estimate of a maximum amplitude of a correlation value, the autocorrelation value, the symbol number of the time delay, and a symbol time length T of M-FSK symbols is estimated as: CFO=phase(Corr(Kmax))/(2π*(T*zz)), wherein phase represents a sought phase position, and the phase position is calculated based on imaginary and real of a complex number. Corr(Kmax) is an autocorrelation value of a maximum of a correlation value magnitude, and Kmax is the position of maximum of autocorrelation value The present disclosure uses an autocorrelative time-frequency synchronization technology to perform a test and time-frequency synchronization of the preamble frame to reduce a calculation amount for receiving the preamble frame.

b) When the preamble frame is the non-repeating sequence (e.g., a pseudo-random sequence), the M-FSK demodulation of the preamble frame is performed using the time-frequency synchronization technology using cross-correlative sliding FFT. The non-repeating sequence comprises a non-repeating sequence based on the M-FSK sequence modulation and is also suitable for other sequences or other modulation schemes, such as a CAZAC sequence or a ZadoffChu sequence.

The present disclosure utilizes the time-frequency synchronization technology using the cross-correlative sliding FFT based on a non-repeating sequence preamble and is based on a sliding FFT method for receiving the M-FSK modulation sequence and a scalable local sequence. The scalable local sequence (i.e., sampling rates are variable) acts on receiving signals with a same sampling rate to perform a conjugate dot product to achieve a deserialization data function. A maximum value and a position information of frequency domain are sought by converting to the frequency domain to obtain a correlation peak value and a value for frequency offset estimation at this time. Peak values at different times are compared. A maximum peak value greater than a certain threshold is a time synchronization point of the preamble, and the frequency offset value is then sought based on a position of the frequency domain of the time synchronization point.

Figure 5:
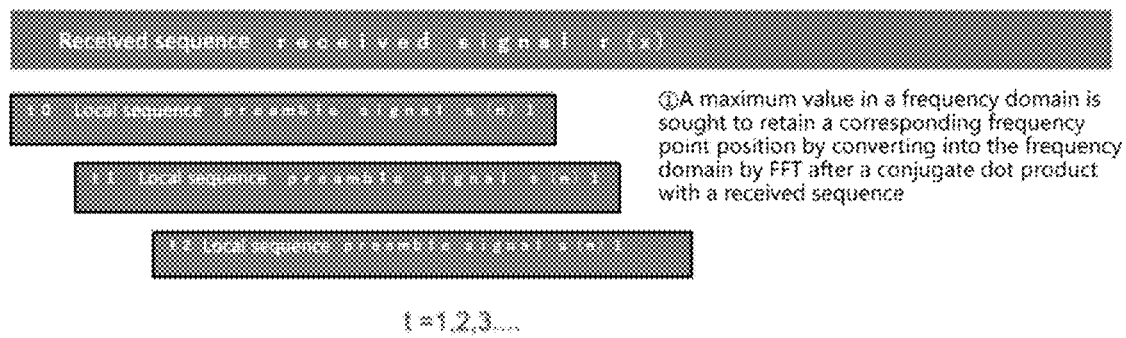
FIG. 5 illustrates a view of a reception of a receiver of a preamble frame using a non-repeating sequence.

Taking a non-repeating sequence of the 2FSK modulation as an example, a reception of a receiver according to the preamble frame is shown in FIG. 5. If there are K 2-FSK preamble symbols, a time length of each of the symbols is T, and a sampling number of each of the symbols is OSR. A sampling rate is then T/OSR, and a length of the scalable local sequence is K*OSR; t0, t1, t2 . . . in FIG. 5 are different sampling time points, and operation steps of each of the different sampling time points are as follows: the preamble signal s(n) of a received sequence and the scalable local sequence is properly zero-padded to a length of power of 2 after several operations such as multiplication, a purpose of the deserialization data is achieved, and an amplitude maximum c(t(k)) and a corresponding frequency point position f(t(k)) in the frequency domain are sought by converting into the frequency domain by FFT. A time point corresponding to a maximum point of an absolute value of a maximum value sequence in frequency domain sequences is a synchronization time of the preamble, i.e., $$t(k_{max}) = \max_{t(k)}(\vec{c}).$$

Figure 6:
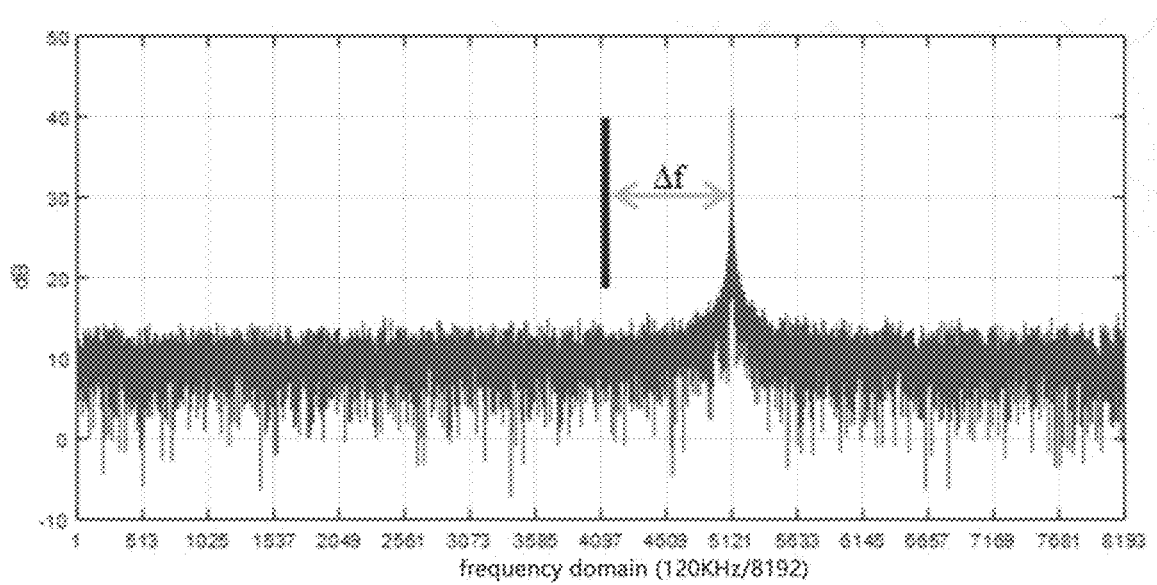
FIG. 6 illustrates a view of a frequency offset interval of a maximum value of synchronization points when the preamble frame using the non-repeating sequence is received.

An estimated range of the frequency offset relates to the sampling rate. If the sampling rate is higher and a bandwidth of a low-pass filter is larger, a tolerable range of the frequency offset is even larger. Therefore, the frequency offset is sought based on a magnitude of a frequency represented by the frequency point position and direct current (DC) frequency point intervals at the synchronization time. For example, FIG. 6 illustrates a view of a frequency offset interval of a maximum of synchronization points. If the bandwidth of the low-pass filter is 120 kHz, the tolerable range of the frequency offset is ±60 kHz.

The present disclosure uses the time-frequency synchronization technology using the cross-correlative sliding FFT to perform a test and time-frequency synchronization of the preamble frame and is not sensitive to the frequency offset. A sensitivity of the M-FSK test and the time-frequency synchronization can be greatly improved while a test sensitivity is low, and the frequency offset can be sought and tolerated in a wider range, meaning that a terminal does not need higher crystal oscillation accuracy.

(2) Demodulating at Least One of the SYNC Frame or the Data Frame

An M-FSK data demodulation technology using adaptive and scalable FFT is used to perform M-FSK demodulation of the SYNC frame or the data frame. Adaptation uses three parameters, such as frequency point intervals SCS, symbol time length, and a number of modulation frequency points, to demodulate scalable advanced M-FSK to transmit the symbols. Adaptive demodulation is demodulation based on data from the M-FSK modulation.

In the embodiments of the present disclosure, the SYNC frame and the data frame have a same demodulation method and can be both demodulated using the M-FSK data demodulation technology using the adaptive and scalable FFT. Different decoding methods can then be used to decode the data during a subsequent decoding. The present disclosure mainly discloses the demodulation method, but the different decoding methods are not limited thereto.

The receiver described in the present disclosure uses a receiver algorithm based on FFT adaptation. The FFT size and frequency point positions are determined based on sub-carrier spacing (SCS) and a time length T of a symbol rate by an appropriate sampling rate (SR). The receiver algorithm specifically comprises:

a) The sampling rate is determined by a signal bandwidth. The signal bandwidth BW=SCS×$2^K$, and the sampling rate satisfies SR>=SCS×$2^K$. When the SR is lager, noise immunity is higher.

b) The FFT size is determined based on the sampling rate (SR) and time lengthens T of the symbols. A number of sampling points of each of the symbols is OSR=SR*T and is filled up to at least $2^K$ by a zero padding method. If OSR values of M-FSK symbols exceed this point number (e.g., $2^K$), an appropriate n is selected to be $2^K \times 2^n$ by the zero padding method. A greatest advantage of this method is that all M-FSK energies are obtained. When orthogonal frequency-division multiplexing (OFDM) has cyclic prefixes, a little bit of symbol energy before the M-FSK symbols can be removed to reduce interference between the M-FSK symbols.

c) A sub-carrier spacing (SCS) size of the modulation frequency points is calculated based on the time lengthens T of the symbols and sub-carrier spacing (SCS):

$$\text{SCS size} = \text{ceil}((2^K \times 2^n)/(SR^*(1/SCS))) = \text{ceil}(T^*SCS)$$

wherein ceil function is rounded up.

d) Filtering, locations of the modulation frequency points are determined based on the M, the SCS size, and the FFT size. Only values of the modulation frequency points are retained in the frequency domain, and other values are set to zero;

e) Amplitude magnitudes of corresponding modulation frequency points are compared, frequency points of energy maximum values are therefore the modulation frequency points, and modulated bits are demodulated based on the modulation frequency points. This method utilizes hard decision. A difference between the maximum value of the modulation frequency points and other frequency point values is small due to noise impacts, and a confidence interval of demodulated bits can be calculated by a value of each of the modulation frequency points using a soft decision method.

Calculation of an embodiment: parameters are SCS=7.5 kHz; M=16 (i.e., K=4); T=1/(4.8 kHz).

According to the calculation, SR>=7.5*16=120 kHz; SR=480 kHz, OSR=SR*T=100; FFT size=128; SCS size=ceil(T*SCS)=2.

Figure 7:
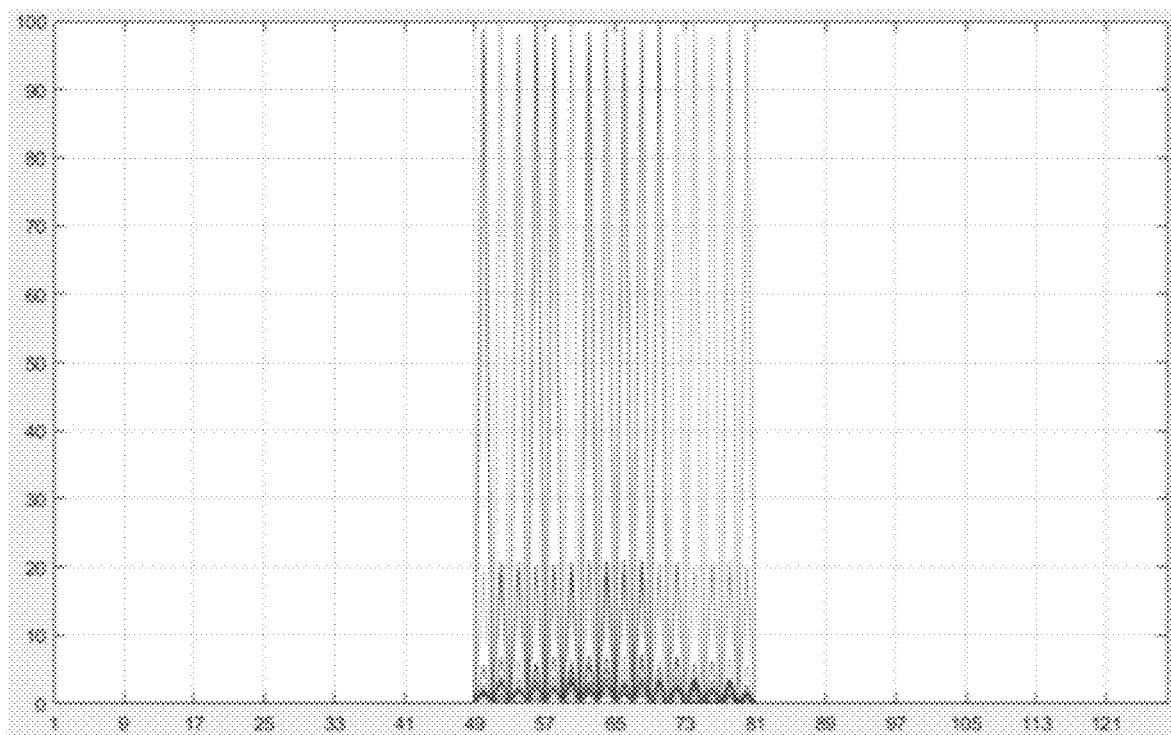
FIG. 7 illustrates an illustrative drawing of an algorithm of a receiver based on fast Fourier transform (FFT) adaptation.
Figure 8:
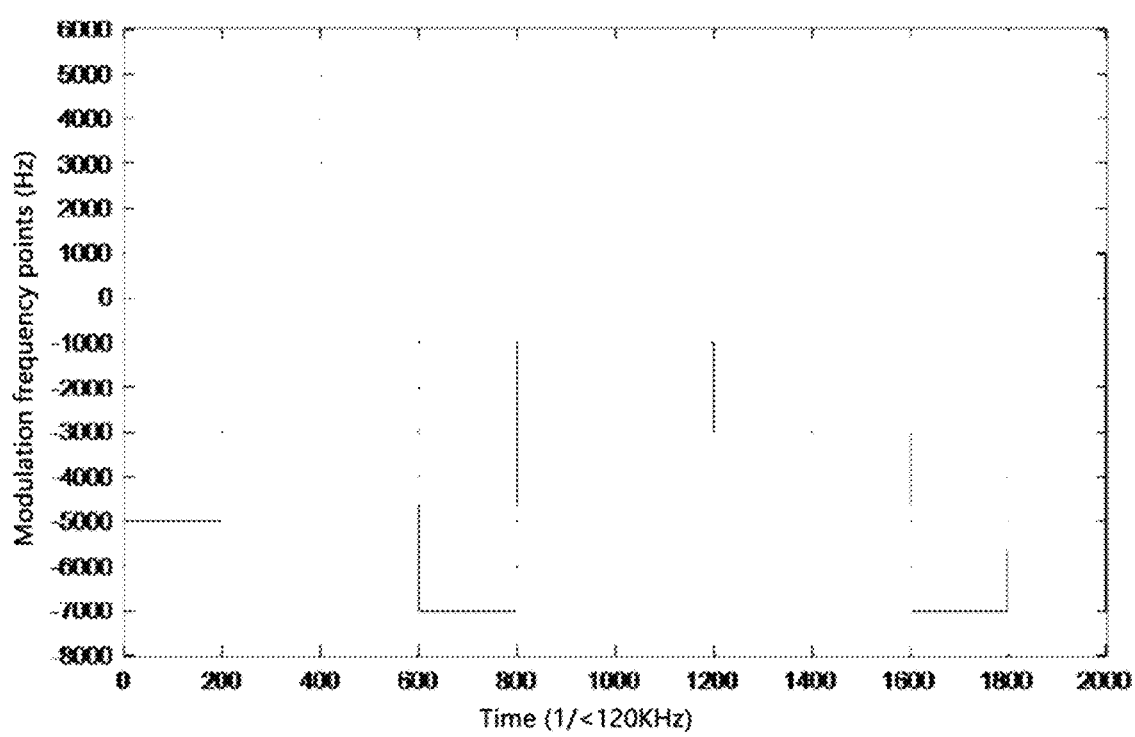
FIG. 8 illustrates an illustration of the M-FSK modulation, wherein M is 8; sub-carrier spacing (SCS) is 2 kHz; time lengthens of symbols are 1/600 seconds or 600 sps (symbols per second).

Based on M=16, 1-1-T size=128, and SCS size=2, after the FFT shown in FIG. 7, the DC carrier wave is cyclically shifted to a center position FFT size/2+1=65 and the modulation frequency points are at a following position (50:2:80).

The present disclosure uses the M-FSK data demodulation technology using the adaptive and scalable FFT to obtain a maximum likelihood test performance. All energy of the M-FSK symbols can be obtained in a maximize extent, and the M-FSK data demodulation technology is particularly suitable for demodulation of low-speed narrowband communications.

The aforementioned described process is relatively specific. A key process is as follows:

The M-FSK data demodulation technology using the adaptive and scalable FFT specifically uses a receiver algorithm based on the FFT adaptation. FFT size and the frequency point positions are determined based on the sub-carrier spacing (SCS) and the time length T of the symbol rate by an appropriate sampling frequency (SR). The M-FSK data demodulation technology specifically comprises:

The sampling frequency is determined by the signal bandwidth.

The FFT size is determined based on the sampling frequency (SR) and the time length T of the symbols.

The sub-carrier spacing (SCS) size of the modulation frequency points is calculated based on the time lengths T of the symbols and sub-carrier spacing (SCS).

The location of the modulated frequency points is determined based on the M, the SCS size, and the FFT size.

The modulated bits are demodulated based on the frequency points.

Embodiment 2

A receiving method based on M-FSK modulation of Embodiment 2 of the present disclosure performs M-FSK demodulation on a frame structure containing a preamble frame, a SYNC frame, and a Data frame. The receiving method specifically comprises:

Demodulating the preamble frame: when the preamble frame is a repeating sequence and each of symbols uses M-FSK modulation, an SNR test and time-frequency synchronization of the preamble frame are performed using an autocorrelative time-frequency synchronization technology. When the preamble frame is a non-repeating sequence, the SNR test and the time-frequency synchronization of the preamble frame are performed using a time-frequency synchronization technology using cross-correlation sliding FFT.

Demodulating at least one of the SYNC frame or the data frame: a maximum likelihood test performance is obtained using an M-FSK data demodulation technology using adaptive and scalable FFT.

The present disclosure provides a method for M-FSK energy test and SNR measurement to enable a receiver to relatively accurately acquire a corresponding reception situation. Data symbols or symbols of the preamble sequence can be used for energy calculation, and a peak value energy in a frequency domain is energy of desired signals. When the data symbols are used, the energy of the desired signals is energy of a maximum point of energy values in the frequency domain.

$$\text{Energy} = \vec{C}(\text{Pos}_{peak})^*\text{conj}(\vec{C}(\text{Pos}_{peak}));$$

When the symbols of the preamble sequence are used, it is the energy of the maximum point of the energy values in the frequency domain at a synchronization time.

The present disclosure respectively seeks signal energy and noise magnitude based on a measurement technology in which signal and noise is separated in the frequency domain based on M-FSK or M-FSK modulation sequences so as to seek a magnitude of a signal-to-noise ratio. The present disclosure specifically provides:

1) Time points are synchronized based on a non-repeating preamble sequence. Energy at a peak value of a frequency domain of deserialization information or near the peak value is therefore the signal energy, time points other than the signal energy is noise energy, and SNR is sought based on the signal energy and the noise energy; and 2) After converting to the frequency domain based on M-FSK data symbols, total energy of points at the peak value of the frequency domain or near the peak value is the signal energy. Frequency points other than the signal energy are the noise energy, and the SNR is sought based on the signal energy and the noise energy.

Since energy leakage of the peak value is taken into account, several frequency points near frequency points of the peak value can be counted as a value of the signal energy, i.e., $$\text{Energy} = \text{sum}(\vec{C}(\text{Pos}_{peak}-k: \text{Pos}_{peak}+k)^*\text{conj}(\vec{C}(\text{Pos}_{peak}-k: \text{Pos}_{peak}+k))),$$

and the energy can be used to determine the magnitude of the received desired signal, i.e., received signal strength indicator (RSSI) calculation;

Interference and noise is calculated, i.e., the signal energy is subtracted from the total energy:

$$\text{Noise} = \text{sum}(\vec{C}.^*\text{conj}(\vec{C})) - \text{Energy; and}$$

A signal-to-noise ratio (SNR) is as follows: SNR=10*log 10 (Energy/Noise), and SNR can determine a status of an air interface channel.

Embodiment 3

Embodiment 3 of the present disclosure provides a method for a receiving signal based on an M-FSK multi-antenna synthesis technology. The method utilizes at least one of a multi-antenna synthesis technology based on peak values of frequency domain functioning as correlation synthesis coefficients or a synchronous multi-antenna synthesis technology based on a non-repeating sequence to enable a receiver end to obtain energy and diversity gains. The multi-antenna synthesis technology uses a maximum ratio combining method or a coherent combining method and can be performed in either time domain or frequency domain. Normally, in the communication systems, in order to obtain antenna weight coefficients, special pilot frequency symbols are required to estimate corresponding antenna weight values. The present disclosure does not require any pilot frequency, only M-FSK data symbols are used to synthesize different antenna data symbols, or a pilot frequency sequence can be used to seek antenna synthesis coefficients.

In this embodiment of the present disclosure, demodulation and synthesis of the data symbols are based on the multi-antenna synthesis technology in which the peak values of the frequency domain function as the correlation synthesis coefficients. A synthesis weight value of each of antennas is a value that correspond to a largest of all frequency points of energy or only a largest value of modulation frequency points is retained after the M-FSK symbols are converted into the frequency domain by sampling using coherent or non-coherent synthesis methods based on each of M-FSK symbols. A synthesis weight value of each of the antennas passes through a value corresponding a largest of the energy in the frequency domain of the M-FSK symbols based on the synchronous multi-antenna synthesis technology based on the non-repeating sequence by sampling using the coherent or non-coherent synthesis methods.

Seeking the antenna synthesis coefficients specifically comprises the following sub-steps:

Step 1 Calculating the Weight Values

The demodulation and the synthesis of the data symbols is a synthesis based on each of the M-FSK symbols, and the synthesis weight value of each of the antennas is the value corresponding to the largest of the all frequency points of the energy after each of the M-FSK symbol is converted into the frequency domain or only retains the largest value $a_i e^{-j\theta}$ of the modulation frequency points or only retains the largest value $a_i e^{-j\theta}$ acquired after the modulation frequency points after filtering. The synthesis weight value of each of the antennas is a value $a_i e^{-j\theta}$ corresponding to a largest energy in the frequency domain at every moment based on the synchronous multi-antenna synthesis technology based on the non-repeating sequence.

Step 2 Computing a Compensation Value

The compensation value is, i.e., energy $N_i$ of all other points except a maximum value position and three points in a vicinity of the maximum value position (as an option, energy within 30 KHz can also be calculated), wherein the $N_i$ represents energy of an i-th point;

Step 3 Computing a Compensation Coefficient

Antenna 0 as a standard, and the compensation factor $\beta_i = \sqrt{N_i/N_0}$;

Step 4 Synthesizing all of Antennas

With respect to the obtained antenna synthesis coefficients $$\vec{C} = \sum_i \beta_i a_i e^{-j\theta_i} * \vec{C}_i,$$

when multiple antennas in a front end receive, interference does not match, synthesis coefficient energy should be normalized, and $\beta_i$ is obtained by calculating based on SNR. When the SN is larger, the synthesis coefficients are larger. The following equation is used for non-coherent combination:

$$\vec{C} = \sum_i \left\| \beta_i a_i e^{-j\theta_i} * \vec{C}_i \right\|^n.$$

The present disclosure is based on the M-FSK multi-antenna synthesis technology. Coherent or non-coherent synthesis methods used to achieve that multi-antenna synthesis gain can be obtained without an additional pilot frequency.

Embodiment 4

Embodiment 4 of the present disclosure provides a receiver based on M-FSK modulation. The receiver uses the methods of Embodiments 1-3.

The aforementioned embodiments are only specific embodiments of the present disclosure and are used to illustrate the technical solutions of the present disclosure but are not limited thereto. The protective scope of the present disclosure is not limited thereto. Although the present disclosure has been described in detail with reference to the aforementioned embodiments, any person of skill in the art can still modify or easily considerably change the technical solutions described in the aforementioned embodiments within the technical scope of the present disclosure, or equivalent replacements of some technical features thereof are performed. The modifications, the variations, or the equivalent replacements will not cause the essence of the corresponding technical solution to depart from the spirit and scope of the technical solution of the embodiments of the present disclosure and should be included in the protective scope of the present disclosure. Therefore, the protective scope of the present disclosure should subject to the protective scope of the claims.

What is claimed is:

1. A receiving method based on multiple frequency-shift keying (M-FSK) modulation, comprising:
    performing M-FSK demodulation on a frame structure comprising a preamble frame, a SYNC frame, and a data frame, wherein the performing comprises:
        demodulating the preamble frame comprising performing the M-FSK demodulation of the preamble frame using an autocorrelation time-frequency synchronization technology when the preamble frame is a repeating sequence and each symbol uses the M-FSK modulation; and performing the M-FSK demodulation of the preamble frame using a time-frequency synchronization technology using cross-correlation sliding fast Fourier transform (FFT) when the preamble frame is a non-repeating sequence; and
        demodulating at least one of the SYNC frame or the data frame comprising performing the M-FSK demodulation of the SYNC frame and the data frame using an M-FSK data demodulation technology using adaptive and scalable FFT.

2. The receiving method based on the M-FSK modulation according to claim 1, comprising:

obtaining a new sequence by autocorrelation of sequences of the preamble frame when the preamble frame is the repeating sequence and each symbol uses the M-FSK modulation, defining a preamble synchronization point corresponding to an autocorrelation peak value point as a synchronization point by satisfying a threshold value, and receiving a complete preamble sequence when an autocorrelation value is maximum.

3. The receiving method based on the M-FSK modulation according to claim 2, further comprising:

obtaining a frequency offset by calculating based on the autocorrelation value of a maximum of a correlation value magnitude, a number of time-delay symbols (zz), and a time length (T) of M-FSK symbols using CFO=phase(Corr(Kmax))/(2π*(T*zz)), wherein:

the phase is a sought phase, the phase is calculated based on imaginary and real parts of a complex number, Corr(k) is the new sequence obtained by the autocorrelation of the sequences of the preamble frame, and Kmax is a position of the maximum of the autocorrelation value magnitude.

4. The receiving method based on the M-FSK modulation according to claim 1, wherein the non-repeating sequence comprises a non-repeating sequence based on modulation of an M-FSK sequence, a constant Amplitude Zero Auto Correlation (CAZAC) sequence, or a ZadoffChu sequence.

5. The receiving method based on the M-FSK modulation according to claim 1, wherein:

the time-frequency synchronization technology using cross-correlation sliding FFT comprises:

using a scalable local sequence to receive signals with a same sampling rate to function as a conjugate dot product to achieve deserialization information based on a sliding FFT method for receiving of an M-FSK modulation sequence and a local sequence, converting into a frequency domain to seek a maximum value and location information in the frequency domain to obtain a correlation peak value at this time and a value for frequency offset estimation, comparing peak values at different times, defining a maximum value of the peak values greater than a certain threshold value as a time synchronization point of the preamble, and seeking a frequency offset value based on frequency magnitude represented by intervals of direct current (DC) frequency points and a position of a frequency point at a synchronization time.

6. The receiving method based on the M-FSK modulation according to claim 1, wherein:

the M-FSK data demodulation technology using adaptive and scalable FFT comprises:

demodulating scalable advanced M-FSK transmit symbols based on of frequency point intervals (subcarrier spacing (SCS)), symbol time length, and a number of modulation frequency points, wherein:

adaptive demodulation is demodulation based on data from the M-FSK modulation.

7. The receiving method based on the M-FSK modulation according to claim 1, wherein:

demodulation and synthesis of data symbols is based on synthesis of each of the M-FSK symbols based on a multi-antenna synthesis technology in which a peak value in a frequency domain functions as correlation synthesis coefficients, and a synthesis weight value of each of antennas is a value corresponding to a largest of all frequency points of energy after the M-FSK symbols are converted into the frequency domain or only retains a largest value of modulation frequency points.

8. The receiving method based on the M-FSK modulation according to claim 7, wherein a synthesis weight value of each of antennas passes through a value corresponding to a largest energy in a frequency domain of the M-FSK symbols based on synchronous multi-antenna synthesis technology using the non-repeating sequence.

9. A receiver based on M-FSK modulation, wherein the receiver uses the receiving method based on the M-FSK modulation according to claim 1.

10. A receiving method based on multiple frequency-shift keying (M-FSK) modulation, comprising:

performing M-FSK demodulation on a frame structure comprising a preamble frame, a SYNC frame, and a data frame, wherein the performing comprises:

demodulating the preamble frame comprising performing signal-to-noise ratio (SNR) test and time-frequency synchronization of the preamble frame by using an autocorrelation time-frequency synchronization technology when the preamble frame is a repeating sequence and each symbol uses the M-FSK modulation; and performing the SNR test and the time-frequency synchronization of the preamble frame using a time-frequency synchronization technology using a cross-correlation sliding fast Fourier transform (FFT) when the preamble frame and is a non-repeating sequence; and demodulating at least one of the SYNC frame or the data frame comprising obtaining a maximum likelihood test performance using an M-FSK data demodulation technology using adaptive and scalable FFT.

11. The receiving method based on the M-FSK modulation according to claim 10, wherein:

demodulation and synthesis of data symbols is based on synthesis of each of the M-FSK symbols based on a multi-antenna synthesis technology in which a peak value in a frequency domain is correlation synthesis coefficients, and a synthesis weight value of each of antennas is a value corresponding to a largest of all frequency points of energy after the M-FSK symbols are converted into the frequency domain or only retains a largest value of modulation frequency points.

12. The receiving method based on the M-FSK modulation according to claim 10, wherein a synthesis weight value of each of antennas passes through a value corresponding to a largest energy in a frequency domain of the M-FSK symbols based on synchronous multi-antenna synthesis technology using the non-repeating sequence.

13. The receiving method based on the M-FSK modulation according to claim 10, wherein:

the SNR test and the time-frequency synchronization comprises:

synchronizing time points based on a non-repeating preamble sequence, defining energy at a peak value in a frequency domain of deserialization information or near the peak value as signal energy, defining time points other than the signal energy as noise energy, and seeking SNR based on the signal energy and the noise energy; and converting into the frequency domain based on the M-FSK symbols, defining a total energy of points at the peak value of the frequency domain or near the peak value as the signal energy, defining frequency points other than the signal energy as the noise energy, and obtaining the SNR based on the signal energy and the noise energy.

* * * * *